United States Patent
Laird et al.

(10) Patent No.: US 7,200,913 B2
(45) Date of Patent: Apr. 10, 2007

(54) METHOD OF AN APPARATUS FOR ASSEMBLING AN AIRCRAFT WHEEL OR BRAKE COMPONENT ON AN AXLE OF AN UNDERCARRIAGE

(75) Inventors: Robert Laird, Bristol (GB); Richard Dawes, Bristol (GB)

(73) Assignee: BAE Systems plc, London (GB)

(*) Notice: Subject to any disclaimer, the term of this patent is extended or adjusted under 35 U.S.C. 154(b) by 298 days.

(21) Appl. No.: 10/381,253

(22) PCT Filed: Sep. 21, 2001

(86) PCT No.: PCT/GB01/04217

§ 371 (c)(1),
(2), (4) Date: Mar. 24, 2003

(87) PCT Pub. No.: WO02/30747

PCT Pub. Date: Apr. 18, 2002

(65) Prior Publication Data

US 2004/0093713 A1    May 20, 2004

(30) Foreign Application Priority Data

Oct. 7, 2000    (GB) ................................ 0024648.8

(51) Int. Cl.
*B23Q 3/00* (2006.01)
*B25B 27/14* (2006.01)
*B60B 29/00* (2006.01)

(52) U.S. Cl. .................... 29/468; 29/464; 29/281.4; 414/428

(58) Field of Classification Search ................ 29/468, 29/464, 802, 281.4, 281.1; 414/732, 728, 414/739, 743, 427, 428; 248/129
See application file for complete search history.

(56) References Cited

U.S. PATENT DOCUMENTS

| | | | |
|---|---|---|---|
| 2,444,992 A | 7/1948 | Kittel | |
| 2,931,519 A | 4/1960 | Colburn | |
| 3,734,304 A | 5/1973 | Cabaniss | |
| 3,752,331 A | 8/1973 | Larmont | |
| 3,937,343 A | 2/1976 | Spulak | |
| 4,566,838 A * | 1/1986 | Binning et al. | 414/278 |
| 4,801,237 A * | 1/1989 | Yamamoto | 414/428 |
| 5,007,789 A | 4/1991 | Painter | |
| 5,181,821 A * | 1/1993 | King, Sr. | 414/427 |
| 5,426,841 A | 6/1995 | Peterson | |
| 5,456,562 A * | 10/1995 | Schlecker et al. | 414/254 |

FOREIGN PATENT DOCUMENTS

FR    2 589 399 A    5/1987

(Continued)

*Primary Examiner*—John C. Hong
(74) *Attorney, Agent, or Firm*—Nixon & Vanderhye P.C.

(57) ABSTRACT

A method of and apparatus for assembling an aircraft wheel or brake (10) component on an axle (26) of an undercarriage in which a holder (12) is provided for the component along with a lifting device (28). The lifting device is used to lift the holder with the component therein to a position where the component is substantially in axial alignment with the axle. Once in that position, assembly of the component on the axle can take place by moving the component axially on to the axle. The holder can then be lowered away from the assembled component.

24 Claims, 3 Drawing Sheets

| | FOREIGN PATENT DOCUMENTS | | |
|---|---|---|---|
| FR | 2 749 838 A1 | 12/1997 | |
| FR | 3 752 331 A | 12/1997 | |
| GB | 2276864 A | 10/1994 | |
| GB | 2 348 866 A | 10/2000 | |
| JP | 360047702 | * | 3/1985 |
| SU | 571412 A | | 10/1977 |
| WO | 98/52775 A | | 11/1998 |

* cited by examiner

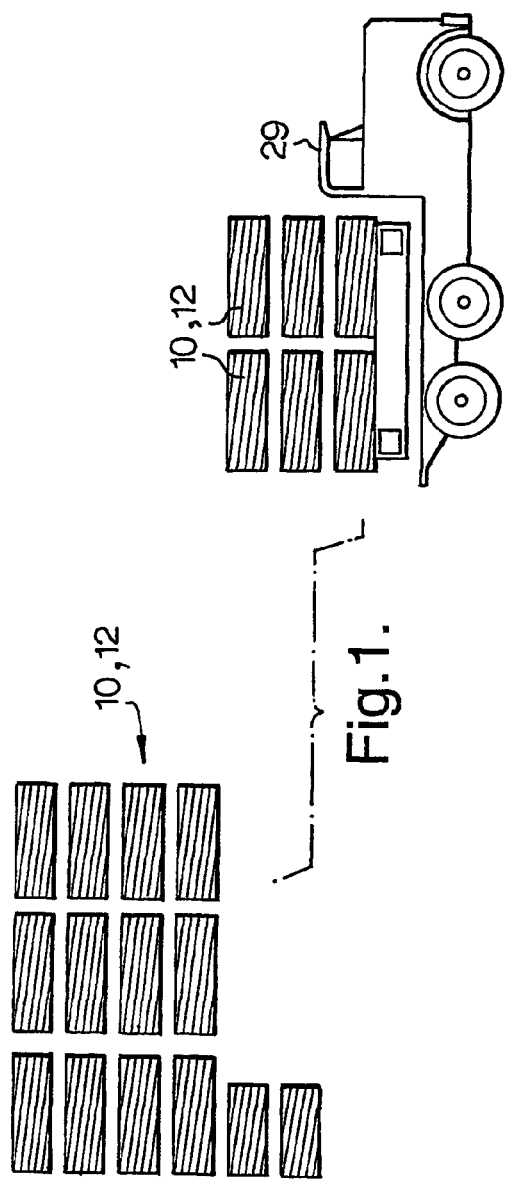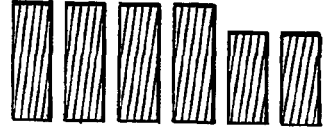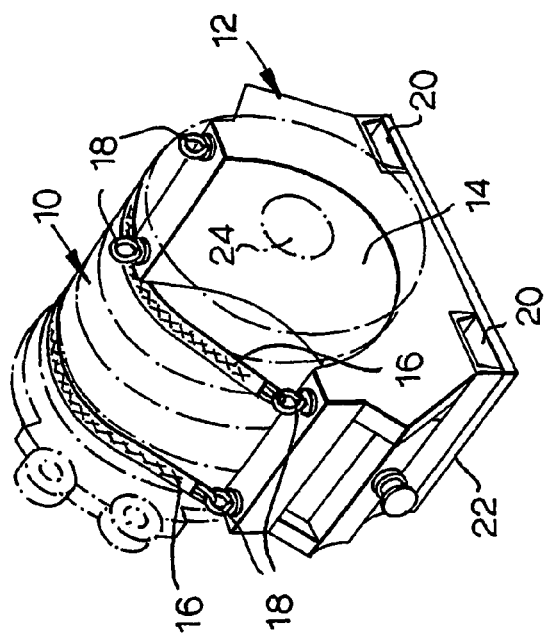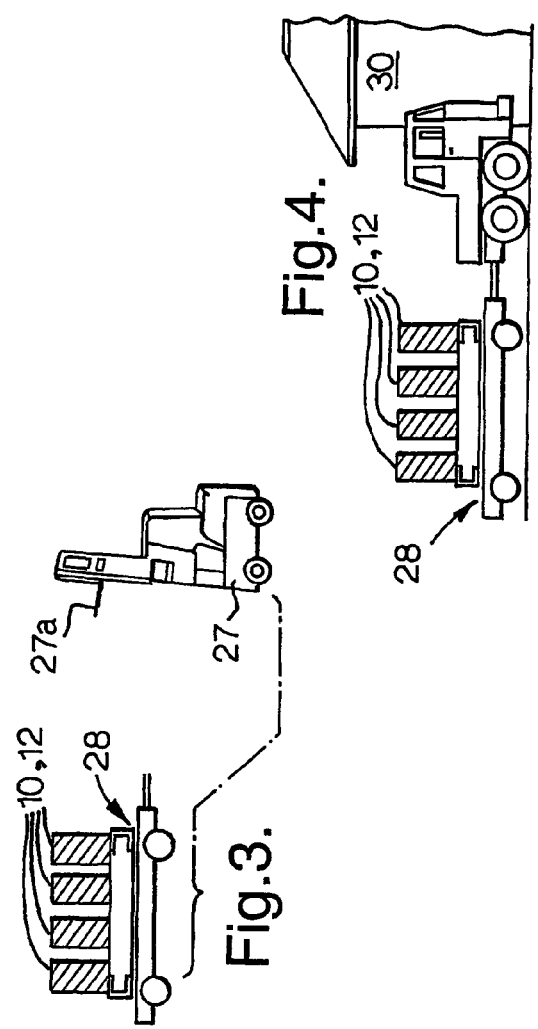

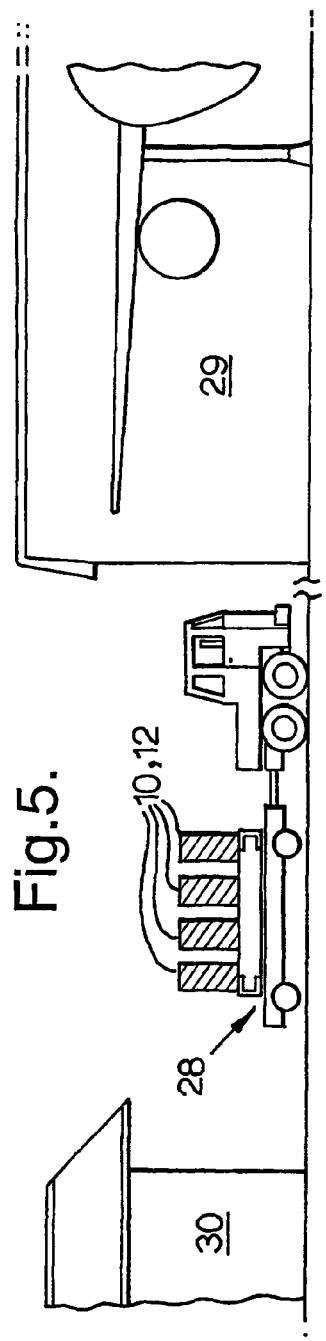
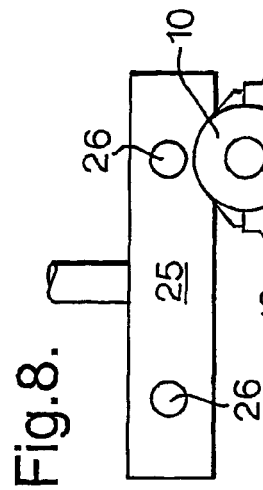
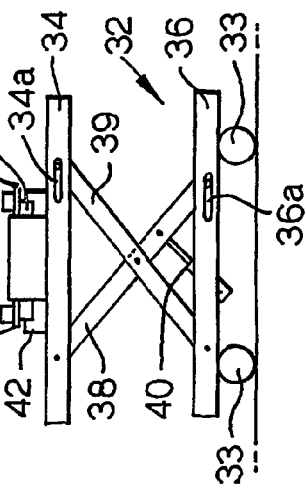
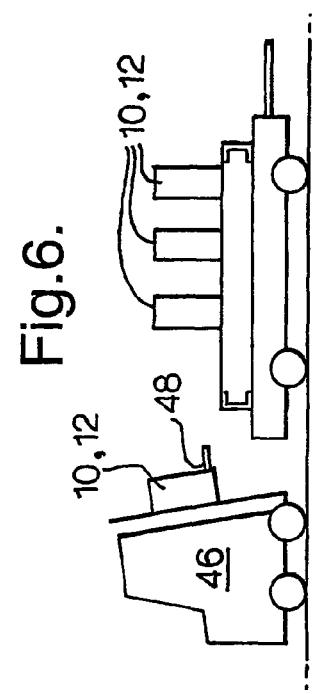

METHOD OF AN APPARATUS FOR ASSEMBLING AN AIRCRAFT WHEEL OR BRAKE COMPONENT ON AN AXLE OF AN UNDERCARRIAGE

This application is the US national phase of international application PCT/GB01/04217 file 21 Sep. 2001, which designated the US.

The invention relates to a method of and apparatus for assembling a wheel or brake component of an aircraft on an axle of an undercarriage.

On large aircraft, the undercarriage includes wheels of a substantial size and weight. For example, the weight of a wheel may be 225 kg and around 1.5 meters in diameter and, hitherto, assembling the wheels tends to be a difficult exercise due to the following:

On the final assembly line, it is common practice to roll the wheels up to the lowered undercarriage leg. In certain instances, it is necessary for final assembly personnel to roll the wheel as far as 200 meters across the final assembly line. As will be appreciated, wheels of the kind referred to above are heavy and difficult to handle. Moreover, the tyres on the wheels are generally contoured making it difficult to keep the rolling wheel upright. It has been known for wheels to be dropped while they are being rolled and it is also easy to bump into other equipment causing damage leading to increased costs and wasted time. Normally, the wheels have to be rolled and bumped over hoses, etc. on the floor making it difficult to control the wheel and involving two operatives.

As well as having to assemble wheels on to an undercarriage leg, a brake assemblies also need to be assembled and, like the wheels, are heavy and difficult to handle. Hitherto, such brake assemblies are manually lifted and assembled on to an undercarriage axle which again can be difficult to do and somewhat hazardous. Typically, brake assemblies have been transported to the final assembly line by means of a trailer with several brakes on board. Occasionally, due to the distance and road conditions in and around the final assembly line, it has been known for brakes to slip from the trailer on to the ground. Where that happens, the brakes have to be returned to the manufacturer for repair or even scrap. Depending upon the availability of additional brake assemblies, delays can occur as well as costs in repairing or replacing the damaged brake.

Normally, the brakes are lifted from the ground by means of a hand pump tool but they still have to be lifted the last 30 cm or so by assembly operatives and offered up to the axle on the undercarriage. Again, the manual manoeuvring involved can be a hazardous exercise bearing in mind that, typically, brakes can weigh approximately 135 kg, can be 0.5 m in diameter and 0.6 m in width. Occasionally, it is necessary for the brakes to be lifted on to the axles totally manually by two operatives with the only protection for the brake being a foam block which is placed in position under the brake to prevent damage to the brake if it slips from the hands of the operators.

What is required is an improved and more efficient way of assembling wheels and brakes on to the axles of an aircraft undercarriage which will minimise the risk to operatives, minimise the risk of damage and which will generally lead to time and cost savings when compared to the existing methods.

According to one aspect of the present invention, there is provided a method of assembling a component such as a wheel or brake on an axle of an aircraft undercarriage, the method comprising providing a holder for the component, providing a lifting device, using the lifting device to lift the holder with the component therein to a position where the component is substantially in axial alignment with the axle, assembling the component on to the axle by moving the component axially into position thereon and lowering the holder from the assembled component.

According to a second aspect of the invention, there is provided apparatus for assembling a component such as a wheel or a brake on an axle of a aircraft undercarriage, the apparatus comprising a holder for the component and a lifting device operable to lift the holder with the component therein to a position substantially in axial alignment with the axle to enable the component to be assembled on the axle by moving the component axially into position thereon, the lifting device subsequently being operable to lower the holder from the assembled component.

By having the components such as a wheel already mounted in a holder, the holder can be conveniently deposited on the mobile lifting device without having to roll the wheel along the ground and the lifting device can then be moved to a position adjacent the undercarriage leg. Once in that position, the lifting device can lift the holder with the wheel therein until the wheel is in axial alignment with the axle of the undercarriage.

Similarly, where the component is in the form of a brake, it is unnecessary to lift the brake manually to a position where it can be assembled onto the axle and, therefore, the method is less hazardous than the one used hitherto. The invention is, therefore, a significant improvement over the current manner of assembly.

Preferably, the method further comprises moving the holder in the axial direction of the axle to assemble the component on the axle. Therefore the component remains in the holder during assembly of the component onto the axle. In that way, the component can remain safely in the holder up until the point that it is safely in position on the axle. The holder can then be removed and assembly personnel have the knowledge that the wheel is securely assembled on the axle.

The method can comprise transporting the component from a store to a location where the component may be positioned on the lifting device. Preferably, the method involves transporting the component from the store with the component already positioned in its holder. Once a suitable transporter has carried the holder and the component therein to a position adjacent the lifting device, means such as a fork lift truck can be used to transfer the holder from the transporter to the lifting device. Preferably the transporter transports a plurality of said components simultaneously which, again, saves time in the assembly process.

The holder may be in the form of a cradle in which the component sits and the cradle may be formed by a substantially cylindrical wall of the holder which supports the component. Retainer means may be provided to prevent the component slipping out of the cradle.

The lifting device may be mobile and may have ground wheels. The lifting device is preferably in the form of a wheeled trolley to enable the component carried thereby to be moved into an appropriate position relative to the undercarriage.

Therefore, the lifting device can be moved to a location convenient for the transfer of the holders from the transporter to the lifting device. The lifting device can then be pulled manually or driven to a position adjacent the undercarriage leg where upon the lifting device can raise the holder and component to the desired position adjacent the axle.

Conveniently, the lifting device may be in the form of a scissor-type lift.

To enable the component to be moved axially on to the axle once it has been lifted in to position, means may be provided which enables the holder to be moved easily towards the axle. The means may comprise a plurality of freely rotatable and closely spaced rollers on which the holder will glide towards the axle under the control of an operative. Suitable stops may be provided to prevent the holder from rolling off the rollers as it is being lifted by the lifting means.

A method and apparatus in accordance with the invention will now be described by way of example with reference to the accompanying diagrammatic illustration which are not to scale and in which:

FIG. 1 shows components mounted in holders at a manufacturing company and a number of the components being transported to an aircraft manufacturer on a lorry;

FIG. 2 is a perspective view of a holder for a brake, the brake being shown in broken lines;

FIG. 3 shows a number of the components which have been removed from the lorry and placed on a trolley;

FIG. 4 shows the trolley being towed to a store;

FIG. 5 shows the way in which the trolley is towed from the store to an appropriate point adjacent an aircraft final assembly line;

FIG. 6 shows the way in which the components in their holders can be removed from the trolley one at a time and taken to a lifting device;

FIG. 7 is an elevation of a lifting device showing a brake in its holder mounted thereon;

FIG. 8 is an elevation of the lifting device shown in FIG. 7 and shown partly raised so as to lift the brake towards an axle on an undercarriage leg;

Figure 9:
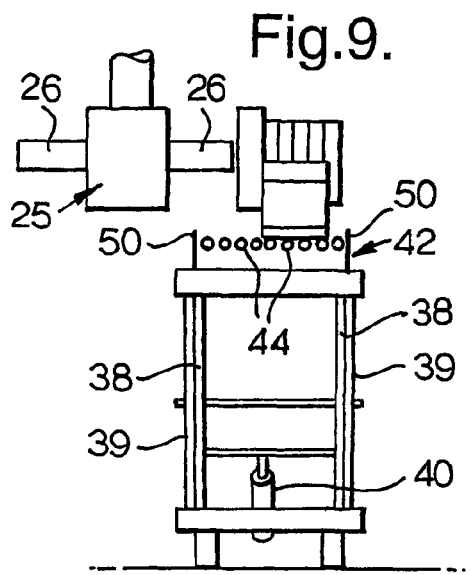
FIG. 9 shows the lifting device in its fully raised position and illustrating the way in which the brake is axially aligned with an axle on the undercarriage leg.

Referring to FIGS. 1 and 2, the manufacturer of aircraft brakes assembles the completed brakes 10 into respective holders 12. The brakes 10 are substantially cylindrical and it will be noted that the holder 12 has a cylindrical wall 14 which forms a cradle for the brakes 10. As shown in FIG. 2, suitable strapping 16 extends between eyes 18 on the holder 12 to hold the brake 10 securely in position in the holder. The holder 12 has two spaced apart openings 20 adjacent a base plate 22 which forms a lower surface for the holder 12. The opening 20 extends for the full width of the holder 12 in the axial direction of the brake 10. It will be noted that the brake 10 has a central cylindrical opening 24 by means of which it is located on an axle 26 of an undercarriage leg 28 (see FIG. 9). In the example shown, the undercarriage leg 25 has four axles 26.

As shown in FIG. 1, the brakes 10 in their holder 12 are loaded on to a lorry 29 and are then transported to a factory of an aircraft manufacturer. Once reaching the factory, the lorry is unloaded by a forklift truck 27 and the holders 12 complete with the brake are placed and secured on trolleys 28, one only of which is shown in FIG. 3. Forks 27a of the forklift truck 27 locate in the openings 20 in the holder 12. The trolleys 28 are then towed as shown in FIG. 4 to a storage area 30 where they are stored until required on the aircraft final assembly line.

When the brakes 10 are called for at final assembly, the trolley 28 is towed to a convenient point on the final assembly line (indicated at 29 in FIG. 5) where there is room to transfer the holders 12 complete with brakes 10 from the trolley 28 to a lifting device 32 shown in FIGS. 6 and 7, and which is described in detail below.

As shown in FIGS. 7 and 8, the lifting device 32 has upper and lower sections 34, 36 which are interconnected by means of scissor-like arms 38, 39. The lower section 36 has castor wheels 33. The arms 38, 39 are pivotally connected to the upper and lower sections 34, 36 as clearly shown in FIG. 8. The upper ends of the arms 39 run in slots 34a in the upper section 34 and the lower ends of arms 38 run in slots 36a in the lower section 36. A hydraulic ram 40 is connected between the lower section 36 and the arms 38, 39 and is used to raise and lower the upper section 34 of the lifting device 32. The upper section 34 carries a roller table 42 on its upper surface. The roller table 42 comprises a plurality of freely rotatable rollers 44 arranged closely adjacent each other in parallel fashion. The rollers 44 are of the same diameter and lie in a common plane. The holders 12 complete with the brakes 10 are removed from the trolley 28 by means of a forklift truck 46, forks 48 of which locate in the openings 20 in the holder 12. The forklift truck 46 picks up one of the holders 12 complete with its brake 10 and carries it to the lifting device 32 which is placed at a convenient position relative to the trolley 28. The forklift truck 46 deposits the holder 12 so that the base plate 22 rests on the roller table 42. Side plates 50 are provided at sides of the roller table 42 to prevent the holder 12 rolling off the roller table 42. Also, safety clamps (not shown) are used to secure the holder 12 in position on the roller table 42.

Once the holder 12 is in position on the lifting device 32 as shown in FIG. 7, the lifting device 32 is towed manually on its wheels 33 to a position immediately beneath the undercarriage leg 28. It will be noted from FIGS. 8 and 9 that the lifting device 28 is manoeuvred so as to position the brake 10 immediately beneath one of the axles 26 but spaced outwardly slightly beyond a free end of the axle 26. The ram 40 is then operated so as to cause the arms 38, 39 to pivot upwardly as shown in FIG. 8 and thereby raise the upper section 34 and the holder 12. Such lifting movement of the lifting device 32 is continued until the cylindrical opening 24 in the brake 10 is aligned coaxially with the associated axle 26 as shown in FIG. 9. It will also be noted from FIG. 9 that the holder 12 is positioned to one side of the roller table 42. With the brake 10 in the FIG. 9 position an operator releases the safety clamps and then moves the holder 12 on the rollers 44 across the roller table 42 so that the brake 10 passes over the axle 26 with the axle 26 entering the cylindrical opening 24. If required, the lifting device 32 can be moved on its wheels 33 so as to cause the brake 10 to pass further over the axle 26 into its final position. The wheels 33 are unlocked for that purpose. Once the brake 10 is fully supported by the axle 26, the brakes are locked in position in the usual way so that it is secured to the undercarriage leg 28. The strapping 16 is then released and the lifting device 32 is lowered so as to bring it back to the FIG. 7 position. The empty holder 12 is then removed by the forklift truck 46 and the next holder 12 complete with brake 10 is transferred by the forklift truck 46 from the trolley 28 to the lifting device 32. The lifting device 32 is then operated as described above to enable the brake 10 to be located on the next axle 26. The wheels 33 are then locked against turning. The procedure is continued until brakes 10 are fully assembled on all four axles 26.

Figure 10:
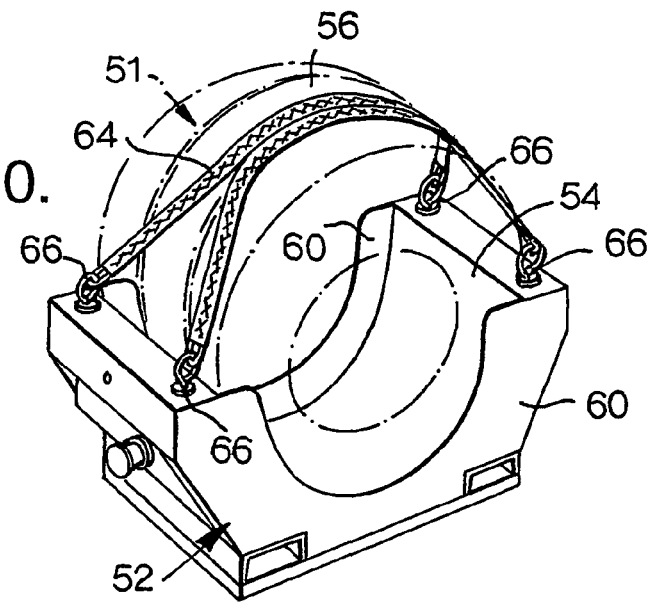
FIG. 10 is a perspective view of a holder for an aircraft wheel, the wheel being shown in broken outline.

The next stage of the assembly is to mount undercarriage wheels 51 on the brakes 10. The undercarriage wheels 51 are brought to the factory of the aircraft manufacturer in the same way as the brakes 10 except that the wheels are located in a holder 52 shown in FIG. 10. The holder 52 has a cylindrical inner surface 54 defining a cradle which receives the wheel 51. A tyre 56 of the wheel 51 sits in the cradle and is retained therein by means of U-shaped side plates 60. Instead of or in addition to using side plates, side arms (not shown) may be provided. Securing strapping 64 extends between eyes 66 so as to hold the wheel 51 securely within its holder 52.

Figure 11:
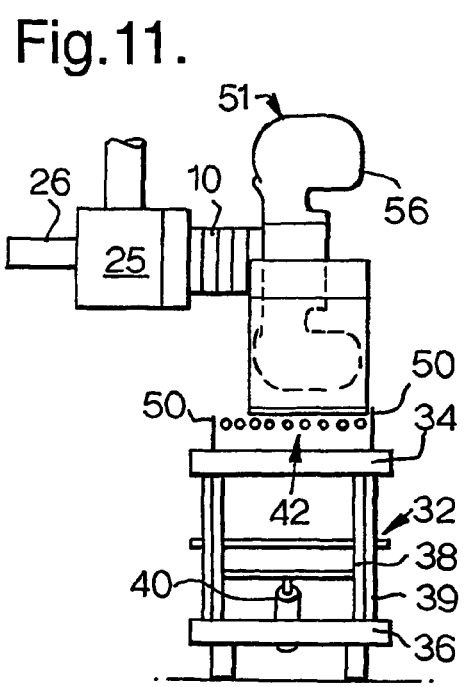
FIG. 11 shows the way in which a wheel in its holder can be aligned with the axle after the brake component has been located on the axle.

The holders 52 complete with wheels 51 are transported in the same way as the brakes 10 as shown in FIGS. 1 to 5 and are finally deposited individually on the roller table 44 of the lifting device 32. They are secured in position on the roller table 44 by safety clamps (not shown). The lifting device 32 is then positioned immediately beneath the undercarriage leg 28 as described with respect to the brake 10 in FIG. 7. The wheels 33 of the lifting device 32 are then locked against turning and the lifting device 32 is raised as described above so as to lift the holder 52 into the position shown in FIG. 11, where the wheel 51 is coaxial with the selected axle 26 and the brake 10 thereon. The safety clamps are removed and holder 52 is then pushed along the roller table 44 so as to locate the brake 10 within the wheel 51. Again, if required, the lifting device can be moved on its wheels 33 so as to cause the wheel 51 to be located fully on the brake 10. The wheels 33 are locked for that purpose. The wheel 51 is then bolted in position and the strapping 64 removed to enable the lifting device to be lowered. The empty holder 52 with its wheel 51 is then removed by the forklift truck and a further holder 52 is deposited on the roller table 42. The procedure is continued until wheels 51 are mounted on all four axles 26.

The empty holders 12, 52 are loaded back on to their respective trolleys 28 and returned to the store 30. Once the next consignment of brakes/wheels manufacturers delivered, the empty holders are collected by the brake/wheel companies and returned for receiving the next batch of brakes/wheels.

It will be appreciated that the invention minimises manual handling of the brakes and wheels and avoids the problems described in the introduction to the specification.

The invention claimed is:

1. A method of assembling an aircraft wheel component or an aircraft brake component on an axle of an undercarriage, the method comprising the steps of:
   providing a holder for the component;
   loading said component into said holder;
   providing a mobile lifting device including a guiding mechanism, said mobile lifting device having lockable wheels;
   using the lifting device to lift the holder with the component therein to a position where the component is substantially in axial alignment with the axle and then locking said wheels;
   assembling the component on to the axle by utilising the guiding mechanism, to maintain axial alignment whilst guiding the component axially into position thereon; and
   lowering the holder from the assembled component.

2. A method according to claim 1 comprising moving the holder in the axial direction of the axle to assemble the component on the axle.

3. A method according to claim 1 including securing the component in place in the holder and releasing the holder from the component after the component has been assembled on to the axle.

4. A method according to claim 1 further comprising transporting the component from a store to a location where the component can be positioned on the lifting device.

5. A method according to claim 4 further comprising transporting the component from the store positioned in its holder.

6. A method according to claim 5 further comprising transferring the holder with the component therein from the transporter to the lifting device.

7. A method of assembling an aircraft wheel component or an aircraft brake component on an axle of an undercarriage, the method comprising the steps of:
   providing a holder for the component,
   providing a mobile lifting device including a guiding mechanism,
   transporting the component in said holder from a store to a location where the component can be positioned on the lifting device,
   using the lifting device to lift the holder with the component therein to a position where the component is substantially in axial alignment with the axle,
   assembling the component on to the axle by utilising the guiding mechanism to maintain axial alignment whilst guiding the component axially into position thereon, and
   lowering the holder from the assembled component.

8. A method according to claim 7 further comprising transferring the holder with the component therein from the transporter to the lifting device.

9. Apparatus for assembling an aircraft wheel component or an aircraft brake component on an axle of an undercarriage, the apparatus comprising;
   a holder for releasably holding the component in an upright position; and
   a lifting device including a guiding mechanism comprising rollers, said lifting device operable to lift the holder with the component therein to a position substantially in axial alignment with the axle and then allowing the component to be guided on to the axle to enable the component to be guided into position by said guiding mechanism on the axle by moving the component axially into position thereon, the lifting device subsequently being operable to lower the empty holder from alignment with said axle.

10. Apparatus according to claim 9 in which the rollers are mounted to enable the holder to be moved in the said axial direction with the component mounted therein.

11. Apparatus according to claim 9 in which the rollers are mounted on the lifting device.

12. Apparatus according to claim 9 in which a stop is provided to limit that extent of movement on the said guiding mechanism.

13. Apparatus according to claim 9 in which securing means is provided for securing the component to the holder.

14. Apparatus according to claim 9 in which the holder is in the form of a cradle in which the component sits.

15. Apparatus according to claim 14 in which the cradle is formed by a substantially cylindrical wall of the holder which supports the component.

16. Apparatus according to claim 14 in which retainer means is provided for retaining the component in the cradle.

17. Apparatus according to claim 14 in which the retainer means is in the form of an arm which projects across an end of the cradle to prevent the component slipping out of the cradle.

18. Apparatus according to claim 9 in which the lifting device is in the form of a wheeled trolley to enable the component carried thereby to be moved into an appropriate position relative to the undercarriage.

19. Apparatus according to claim 18 in which at least some of the wheels can swivel or steer to provided maximum manoeuvrability.

20. Apparatus according to claim 9 in which the lifting device is in the form of a scissor lift.

21. A method of operating the apparatus according to claim 9 including the step of providing a transporter for transporting the component from a store to a position where the component can be positioned on the lifting device, wherein the transporter transports the holder with the component already positioned in the holder.

22. Apparatus according to claim 21 in which the transporter transports from the store a plurality of said components simultaneously.

23. Apparatus according to claim 9 in which transfer means is provided for transferring the holder with the component therein from the transporter to the lifting device.

24. Apparatus for assembling an aircraft wheel component or an aircraft brake component on an axle of an undercarriage, the apparatus comprising;
 a holder for releasably holding the component in an upright position, said holder including a component located therein; and
 a lifting device, said lifting device including a guiding mechanism, said lifting device comprising a means for lifting the holder with the component therein to a position substantially in axial alignment with the axle and then allowing the component to be guided on to the axle enabling the component to be assembled on the axle by moving the component axially into position thereon, the lifting device subsequently being operable to lower the holder from alignment with said guiding mechanism, said guiding mechanism comprises rollers.

* * * * *